(12) United States Patent
Wang

(10) Patent No.: US 9,388,914 B2
(45) Date of Patent: Jul. 12, 2016

(54) ROTARY SWITCH TYPE VALVE CAP

(71) Applicant: Beto Engineering and Marketing Co., Ltd, Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 34 days.

(21) Appl. No.: 14/512,330

(22) Filed: Oct. 10, 2014

(65) Prior Publication Data

US 2016/0018020 A1    Jan. 21, 2016

(30) Foreign Application Priority Data

Jul. 15, 2014  (TW) .............................. 103124322 A

(51) Int. Cl.
*F16K 15/20*   (2006.01)
*F16K 31/60*   (2006.01)
*F04B 33/00*   (2006.01)
*F16K 11/04*   (2006.01)

(52) U.S. Cl.
CPC ............. *F16K 31/602* (2013.01); *F04B 33/005* (2013.01); *F16K 11/04* (2013.01); *Y10T 137/3724* (2015.04)

(58) Field of Classification Search
CPC ... B60S 5/04; F04B 33/005; Y10T 137/2584; Y10T 137/3724; Y10T 137/5196; Y10T 137/5283

See application file for complete search history.

(56) References Cited

U.S. PATENT DOCUMENTS

| | | | | |
|---|---|---|---|---|
| 5,666,990 A | * | 9/1997 | Wu | ........................... B60S 5/04 137/223 |
| 5,683,234 A | * | 11/1997 | Chuang | ................. F04B 33/005 137/223 |
| 5,749,392 A | * | 5/1998 | Glotin | ................... F04B 33/005 137/223 |
| 5,960,815 A | | 10/1999 | Wang | |
| 6,843,270 B1 | * | 1/2005 | Wang | ........................ B60S 5/04 137/223 |
| 8,402,987 B2 | | 3/2013 | Wang | |
| 2013/0206249 A1 | * | 8/2013 | Wu | ......................... F04B 33/00 137/231 |

* cited by examiner

Primary Examiner — R. K. Arundale
(74) Attorney, Agent, or Firm — Muncy, Geissler, Olds & Lowe, P.C.

(57) ABSTRACT

A rotary switch type valve cap includes a casing including an accommodation space that is surrounded by the front, rear and top end walls and an air intake tube located at the rear end wall and kept in communication with the accommodation space, a rotating device pivotally mounted in the accommodation space and including two valve connectors respectively arranged at two opposite ends thereof in such a manner that when the second valve connector is disposed in a hidden position to face toward the top end wall, the first valve connector is disposed in an operating position to face toward a bottom side of the casing where the rotating device is disposed in its normal state, a lever pivotally mounted at the top end wall, a closure member mounted in the top end wall between the lever and the rotating device.

7 Claims, 20 Drawing Sheets

ROTARY SWITCH TYPE VALVE CAP

BACKGROUND OF THE INVENTION

1. Field of the Invention

The present invention relates to valve technology and more particularly, to a rotary switch type valve cap, which comprises two valve connectors that can be alternatively switched through a rotary motion.

2. Description of the Related Art

U.S. Pat. No. 5,960,815 discloses an air pump with an automatically switchable air valve cap that comprises a Presta (French) valve connector and a Schrader (American) valve connector arranged in parallel, and a switching device for switching the air flow direction. This design of valve cap has a large size. When attached to the tire of a conventional wire spoke wheel, the wire spokes will hinder the operation of the valve cap.

U.S. Pat. No. 8,402,987B2 discloses a dual-mode valve cap. This design of dual-mode valve cap has a small size. However, when connecting the dual-mode valve cap to the valve, the user needs to rotate the valve cap with the fingers to further thread an internal thread thereof onto an outer thread of the valve. This installation procedure is somewhat inconvenient.

SUMMARY OF THE INVENTION

The present invention has been accomplished under the circumstances in view. It is the main object of the present invention to provide a rotary switch type valve cap, which provides two valve connectors in a compact mechanism, and is conveniently operable through a rotary motion to switch between the two valve connectors.

To achieve this and other objects of the present invention, a rotary switch type valve cap comprises: a casing comprising a front end wall, a rear end wall, a top end wall connected between the front and rear end walls, an accommodation space surrounded by the front and rear end walls and the top end wall, and an air intake tube located at the rear end wall and kept in communication with the accommodation space; a rotating device pivotally mounted in the accommodation space and freely rotatable, comprising a first valve connector and a second valve connector respectively arranged at two opposite ends thereof in such a manner that when the second valve connector is disposed in a hidden position to face toward the top end wall, the first valve connector is disposed in an operating position to face toward a bottom side of the casing where the rotating device is disposed in its normal state; a lever pivotally mounted at the top end wall and biasable between a release position and a pressing position; a closure member mounted in the top end wall between the lever and the rotating device in such a manner that when the rotating device is disposed in its normal state, the lever can be biased to the pressing position to hold down the closure member against the second valve connector in the hidden position where the second valve connector is closed and forced to stop the first valve connector in the operating position in positive engagement with the valve to be inflated.

Other advantages and features of the present invention will be fully understood by reference to the following specification in conjunction with the accompanying drawings, in which like reference signs denote like components of structure.

BRIEF DESCRIPTION OF THE DRAWINGS

FIG. 11 is a sectional view taken along line A-A of FIG. 6; FIG. 12 is a sectional view taken along line C-C of FIG. 6; FIGS. 13 and 14 respectively correspond to FIGS. 11 and 12 with the exception that the lever is disposed in the pressing position.

FIG. 15 is a sectional view taken along line A-A of FIG. 6; FIG. 16 is a sectional view taken along line C-C of FIG. 6; FIGS. 17 and 18 respectively correspond to FIGS. 15 and 16 with the exception that the lever is disposed in the pressing position.

DETAILED DESCRIPTION OF THE INVENTION

Figure 1:
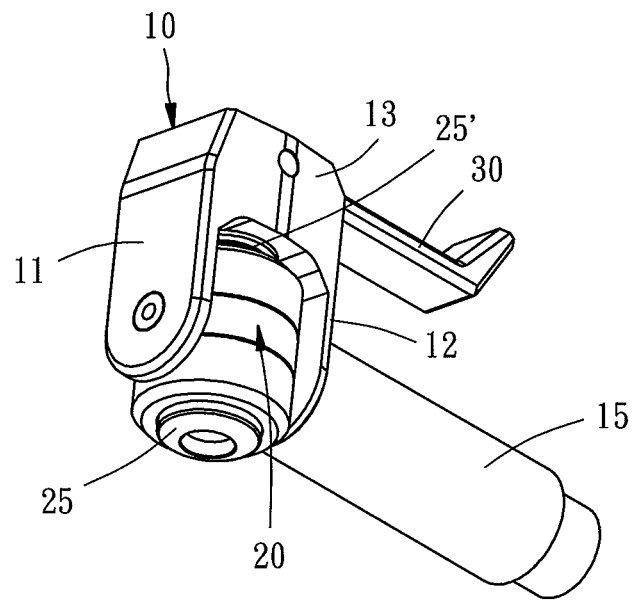
FIG. 1 is an oblique top elevational view of a rotary switch type valve cap in accordance with a first embodiment of the present invention, illustrating a rotating device in its normal state.
Figure 2:
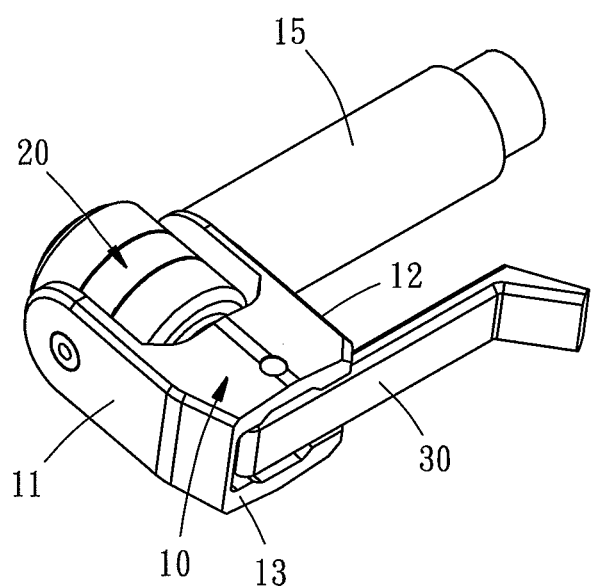
FIG. 2 corresponds to FIG. 1 when viewed from another angle.
Figure 13:
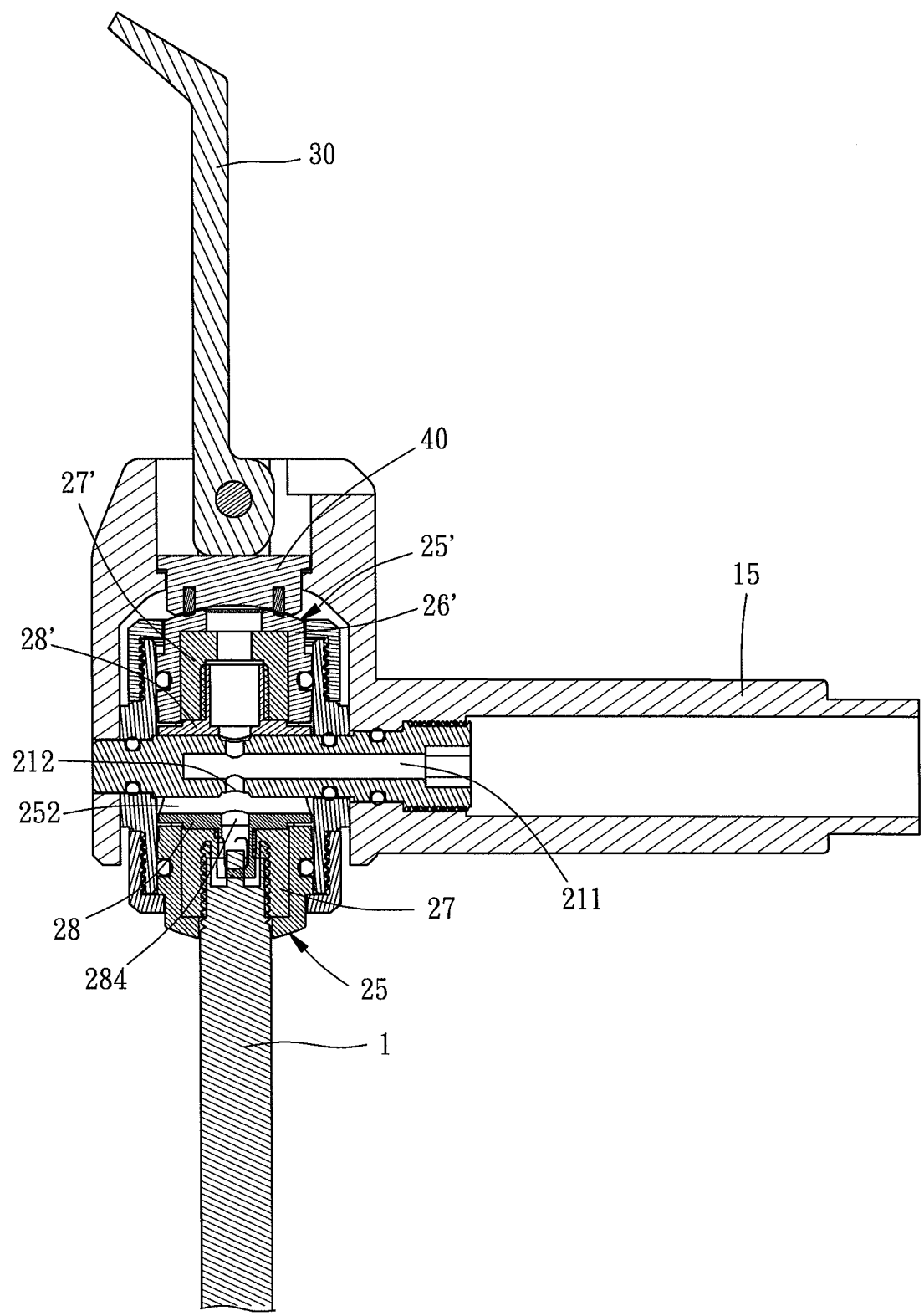
Figure 14:
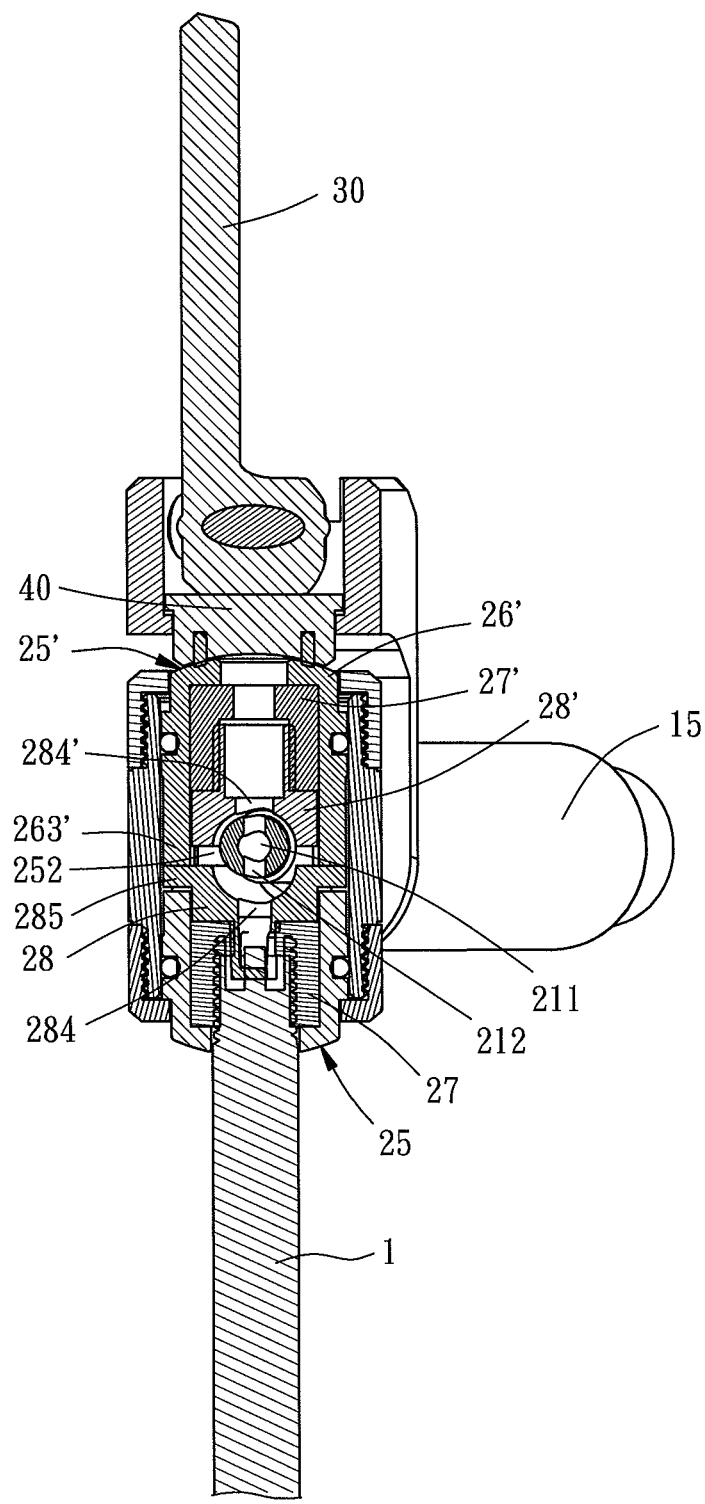
Figure 15:
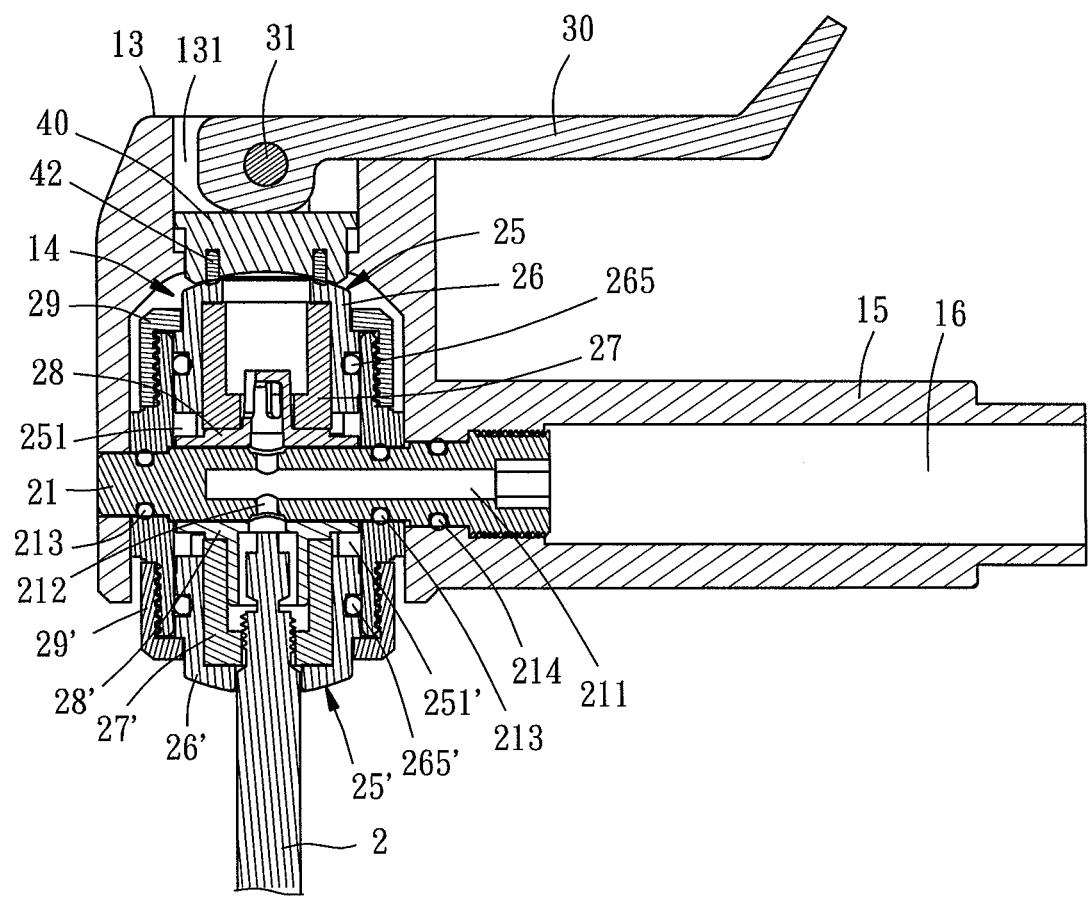
FIGS. 15-18 are schematic operational views of the first embodiment of the present invention, illustrating the rotary switch type valve cap connected to a Presta (French) valve, in which the lever shown in FIGS. 15 and 16 is disposed in the release position.
Figure 16:
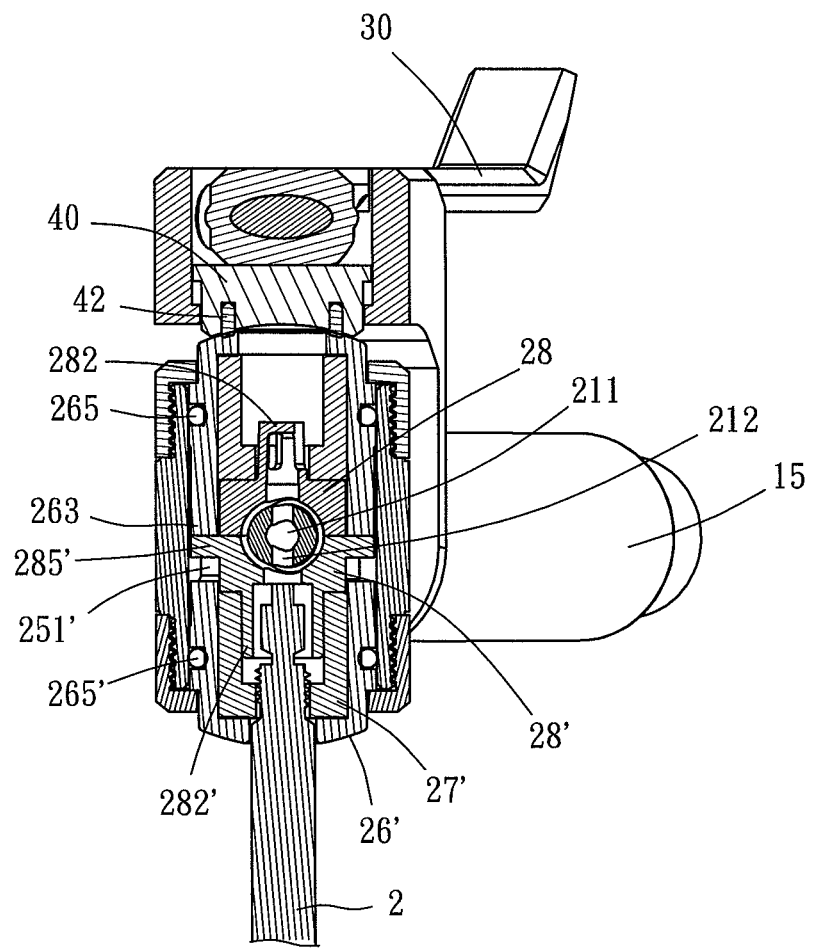

The advantages and features of the present invention will be fully understood by way of the following two embodiments in conjunction with the annexed drawings Referring to FIGS. 1-18, a rotary switch type valve cap in accordance with a first embodiment of the present invention is shown. The rotary switch type valve cap comprises:

a casing (10) comprising a front end wall (11), a rear end wall (12), a top end wall (13) connected between the front end wall (11) and the rear end wall (12), an accommodation space (14) surrounded by the front end wall (11), the rear end wall (12) and the top end wall (13), and an air intake tube (15) located at the rear end wall (12) in communication with the accommodation space (14);

a rotating device (20) pivotally mounted in the accommodation space (14) and freely rotatable (see FIGS. 3 and 4), comprising two valve connectors (25)(25') respectively arranged at two opposite ends thereof in such a manner that when one valve connector (25') is disposed in a hidden position to face toward the top end wall (13), the other valve connector (25) is disposed in an operating position to face toward a bottom side of the casing (10) where the rotating device (20) is disposed in its normal state (see FIGS. 1 and 2);

a lever (30) pivotally connected to the top end wall (13) and movable between a release position (see FIG. 11) and a pressing position (see FIG. 13);

a closure member (40) mounted in the top end wall (13) between the lever (30) and the rotating device (20) in such a manner that when the rotating device (20) is disposed in its normal state, the lever (30) can be biased to the pressing position (see FIG. 13) to hold down the closure member (40) against the valve connector (25') in the hidden position where the valve connector (25') is closed and forced to stop the valve connector (25) in the operating position in positive engagement with the valve to be inflated.

In this first embodiment, the rotating device (20) is pivotally mounted in the accommodation space (14); the air intake tube (15) is mounted in the rear end wall (12) corresponding to the pivoting position of the rotating device (20); the rotating device (20) has an axial blind hole defined in a pivot shaft thereof in communication with an air passage (16) in the air intake tube (15).

Further, the rotating device (20) is pivotally connected between the front end wall (11) and rear end wall (12) of the casing (10) by a pivot shaft (21). The pivot shaft (21) is inserted through the rear end wall (12) in communication with the air intake tube (15). The pivot shaft (21) comprises an axial blind hole (211) in communication with the air passage (16) of the intake tube (15), a radially extended through hole (212) in communication with the valve connectors (25)(25') and the axial blind hole (211), two seal rings (213) respectively mounted around the periphery thereof at two opposite sides relative to the radially extended through hole (212) to keep a body (22) thereof and the pivot shaft (21) in an airtight status, and a seal ring (214) mounted around the periphery thereof near the axial blind hole (211) to keep the pivot shaft (21) and the air intake tube (15) in an airtight status.

Figure 17:
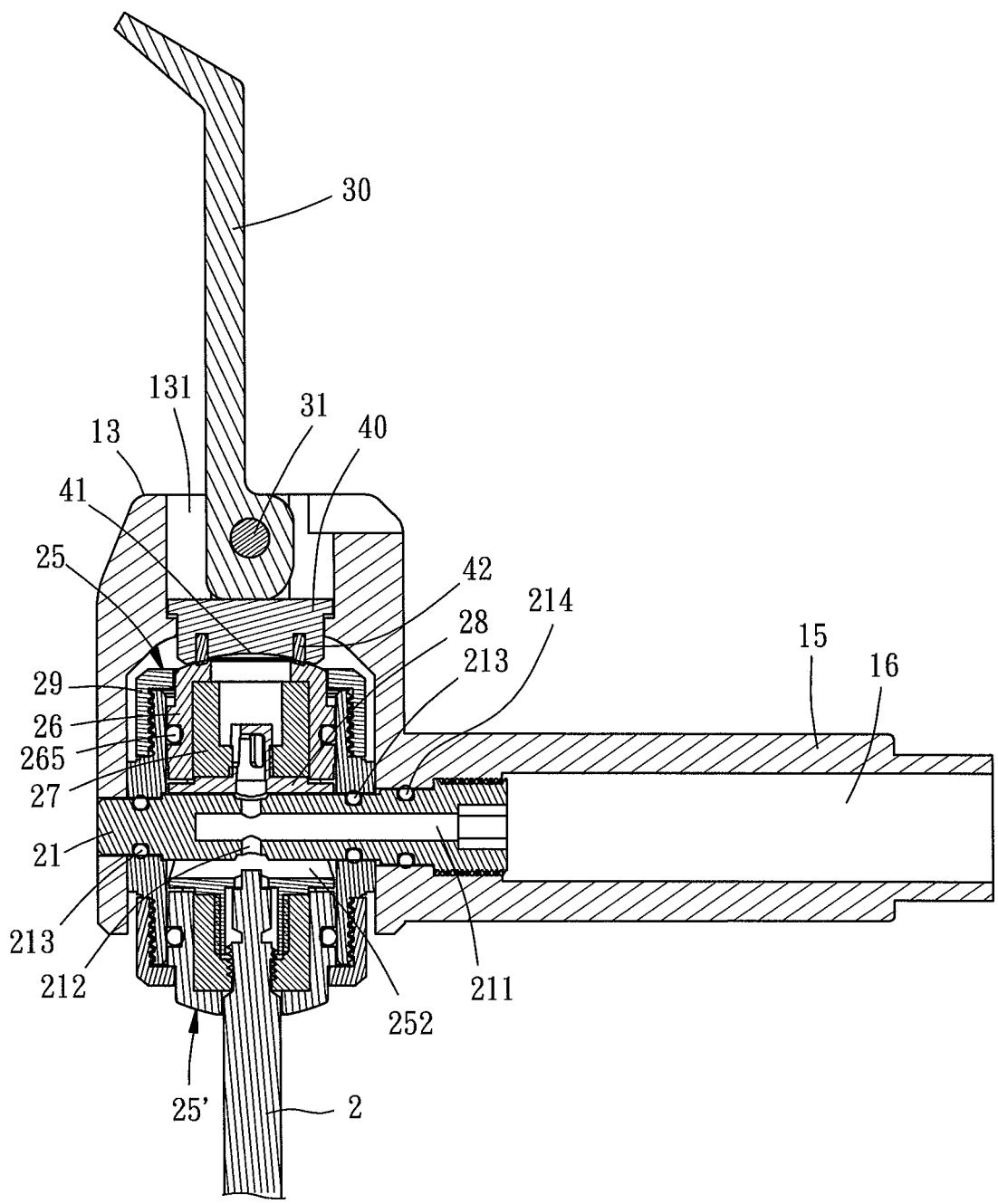
Figure 18:
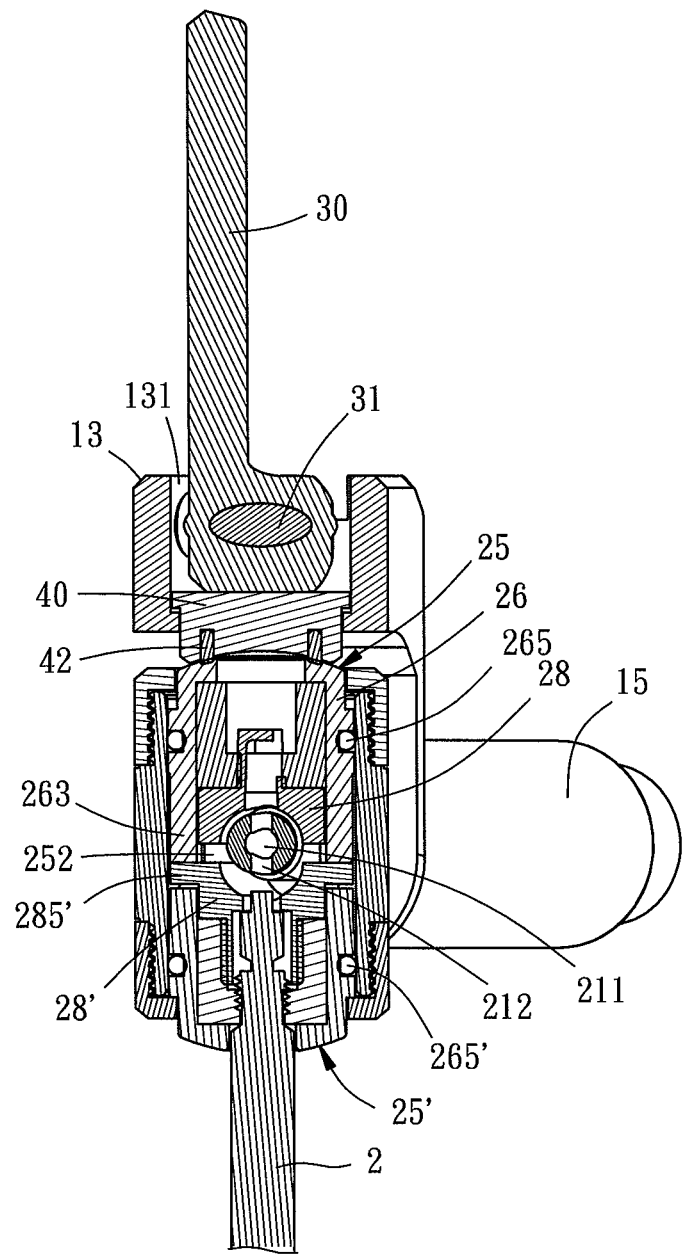

The body (22) of the rotating device (20) is a tubular member (see FIGS. 5 and 7), having two through holes (221) disposed at two opposite sides on the middle; the aforesaid pivot shaft (21) is inserted through the air passage (16) of the air intake tube (15) and the two through holes (221) of the body (22) to pivotally connect the body (22) to the front side of the casing (10) between the front and rear end walls (11) (12), enabling the air passage (16) of the air intake tube (15) to be kept in communication with the inside space of the body (22) via the axial blind hole (211) and the radially extended through hole (212); the aforesaid two valve connectors (25) (25') are mounted in the body (22) at opposing top and bottom sides relative to the pivot shaft (21), wherein each valve connector (25)(25') comprises: a housing member (26)(26'), a rubber packer (27)(27'), a valve part (28)(28') and an end cap (29)(29'). The housing member (26)(26') is a cylindrical member, comprising a shoulder (261)(261') located at one end thereof, a through hole (262)(262') located at the center of the shoulder (261)(261') for the insertion of the valve (1)(2) to be inflated (see FIG. 11 and FIG. 15), and at least two stop rods (263)(263') protruded from an opposite end thereof. The rubber packer (27)(27') is accommodated in the housing member (26)(26'), and elastically deformable to expand and to reduce the axial hole (271)(271') therein so as to hold down the valve (1)(2) (the valve (1) shown in FIG. 13 is a Schrader (American) valve; the valve (2) shown in FIG. 17 is a Presta (French) valve) to be inflated. The valve part (28)(28') is mounted in the housing member (26)(26') adjacent to the stop rods (263)(263'). The width of the outer lateral wall of the valve part (28)(28') is approximately equal to the width of the housing member (26)(26'). Further, the valve part (28)(28') comprises a plurality of notches (281)(281') corresponding to the stop rods (263)(263') so that the stop rods (263)(263') can extend through the respective notches (281)(281'). Further, the valve part (28)(28') blocks the housing member (26)(26') to hold the rubber packer (27)(27') in the housing member (26)(26'). The length of the rubber packer (27)(27') is slightly larger than the depth of the housing member (26)(26') so that a gap (251)(251') is left between the valve part (28)(28') and the housing member (26)(26') when the rubber packer (27) (27') receives no pressure. Subject to the presence of the gap (251)(251'), the valve part (28)(28') and the housing member (26)(26') can be forced to move relative each other and to further elastically deform the rubber packer (27)(27'). The valve part (28)(28') comprises a valve protrusion (282)(282') extending toward the rubber packer (27)(27'). The valve protrusion (282)(282') is inserted into the axial hole (271)(271') of the rubber packer (27)(27'). Further, the valve protrusion (282)(282') is configured subject to the configuration of the valve (1)(2) to be secured. The valve protrusion (282) of the valve part (28) of one valve connector (25) is shaped like a protruding rod having a groove at one lateral side thereof for fitting a Schrader (American) valve (1). The valve protrusion (282') of the valve part (28') of the other valve connector (25') is shaped like a barrel for fitting a Presta (French) valve (2). The valve part (28)(28') further comprises an elongated arc groove (283)(283') corresponding to the pivot shaft (21), a through hole (284)(284') located at the center of the elongated arc groove (283)(283') and extending through the valve protrusion (282)(282') and kept in communication with the through hole (212) of the pivot shaft (21), and a plurality of end walls (285)(285') disposed adjacent to the elongated arc groove (20)(283') for pushing the stop rods (263')(263) of the opposite valve part (28')(28). The housing member (26)(26'), the rubber packer (27)(27') and the valve part (28)(28') are accommodated in the body (22). The end cap (29)(29') is fixedly mounted at an outer side of the body (22) to seal the housing member (26)(26'), the rubber packer (27)(27') and the valve part (28)(28') in the body (22) in an airtight manner. Further, the end cap (29)(29') comprises a through hole (291) (291') at the center. The shoulder (261)(262) of the housing member (26)(26') extends through the through hole (291) (291') to the outside of the end cap (29)(29').

The housing member (26)(26') further comprises a convex outer end surface (264)(264'). The closure member (40) comprises a concave inner end surface (41) mating the convex outer end surface (264)(264'), an annular seal ring (42) located at the concave inner end surface (41) to surround the through hole (262)(262') of the shoulder (261)(261') of the housing member (26)(26'). The casing (10) further comprises an accommodation chamber (131) defined in the top end wall (13) thereof. The closure member (40) is accommodated in the accommodation chamber (131) and axially movable back and forth in the accommodation chamber (131). The lever (30) is pivotally connected to the top end wall (13) by a pivot pin (31). When the lever (30) is biased from the release position to the pressing position, it forces the closure member (40) to move toward the housing member (26') and to further seal the housing member (26'). The two housing members (26)(26') each have a respective seal ring (265)(265')

mounted thereon to keep the housing member (26)(26') and the body (22) in an airtight manner.

Figure 11:
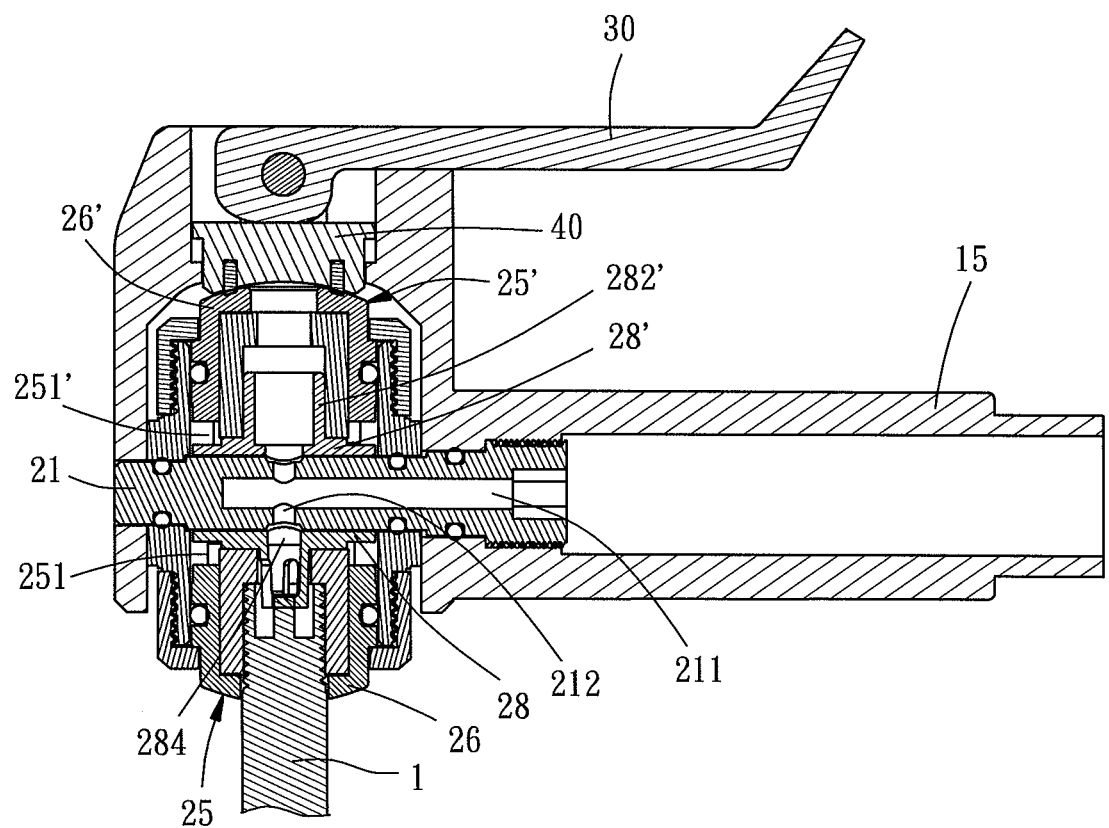
FIGS. 11-14 are schematic operational views of the first embodiment of the present invention, illustrating the rotary switch type valve cap connected to a Schrader (American) valve, in which the lever shown in FIGS. 11 and 12 is disposed in the release position.
Figure 12:
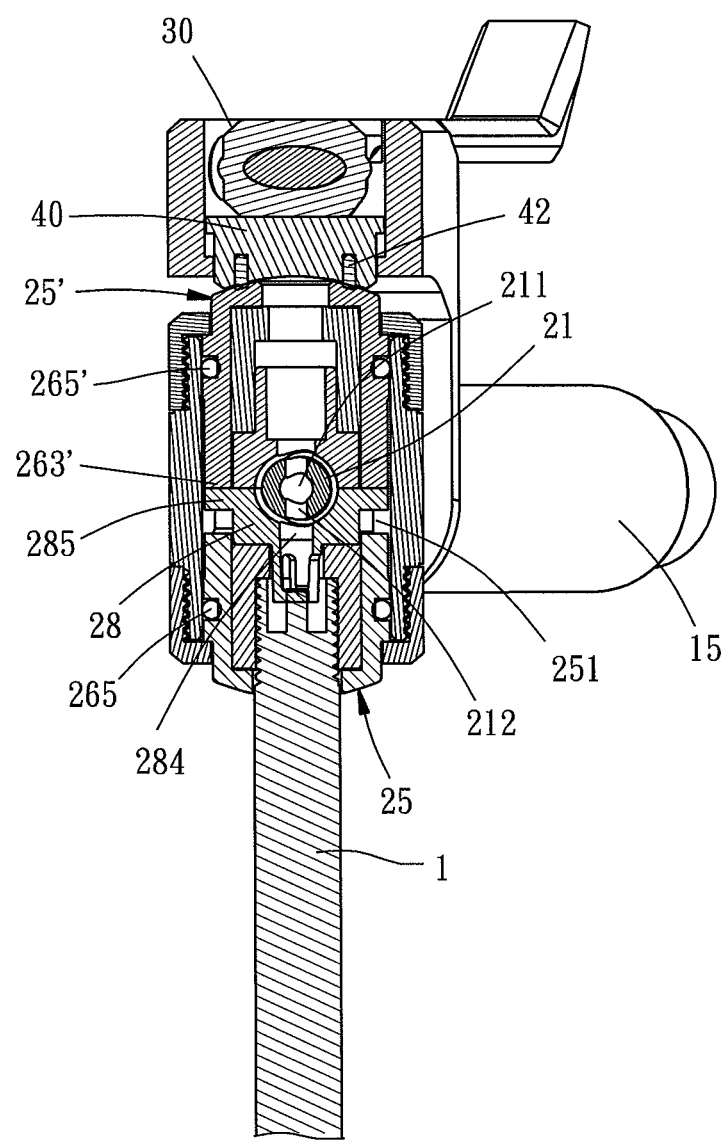

FIGS. 11-14 illustrate the rotary switch type valve cap used with a Schrader (American) valve (1). As illustrated in FIGS. 11 and 12, the Schrader (American) valve (1) is inserted into the valve connector (25). At this time, the lever (30) is disposed in the release position; the closure member (40) receives no pressure and does not press the valve connector (25'); the gap (251)(251') between the housing member (26)(26') and the valve part (28)(28') is maintained at the initial setting value; as illustrated in FIG. 12, the stop rods (263') of the housing member (26') that are disposed above the pivot shaft (21) are stopped against the end walls (285) of the valve part (28) that are disposed below the pivot shaft (21); as illustrated in FIG. 13, when lifting the lever (30), the lever (30) will move the closure member (40) downwardly to a predetermined distance to further move the housing member (26') of the valve connector (25') downwards, causing the stop rods (263') of the housing member (26') to push the valve part (28) downwards (the valve part (28') is stopped from downward displacement by the pivot shaft (21)), and thus the two rubber packers (27)(27') will be simultaneously and elastically expanded to diminish the respective gaps (251)(251') and to cause formation of a predetermined gap (252) between the two valve parts (28)(28') (see FIGS. 13 and 14). When expanded, the rubber packer (27) will secure the Schrader (American) valve (1) in an airtight manner, and the closure member (40) will seal the through hole (262') of the housing member (26') airtightly, allowing the intake air from the air intake tube (15) to go through the axial blind hole (211), the through hole (212) and the through hole (284) into the Schrader (American) valve (1).

Figure 3:
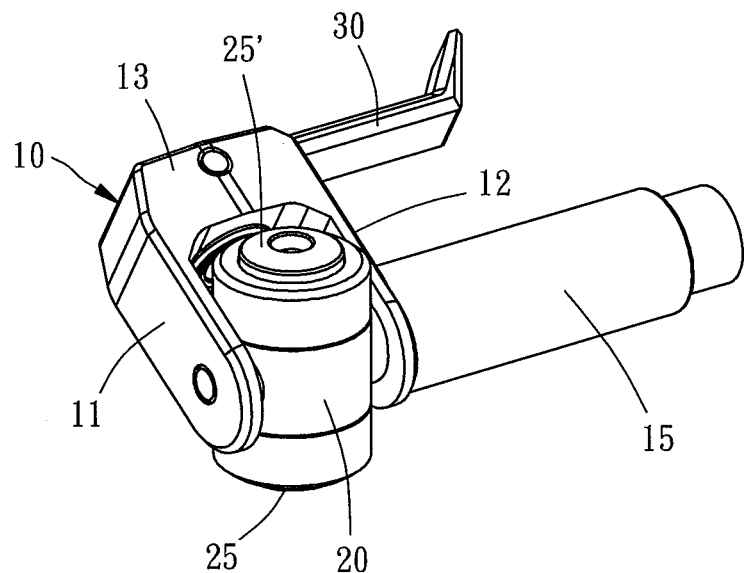
FIG. 3 corresponds to FIG. 1, illustrating the rotating device rotated.
Figure 4:
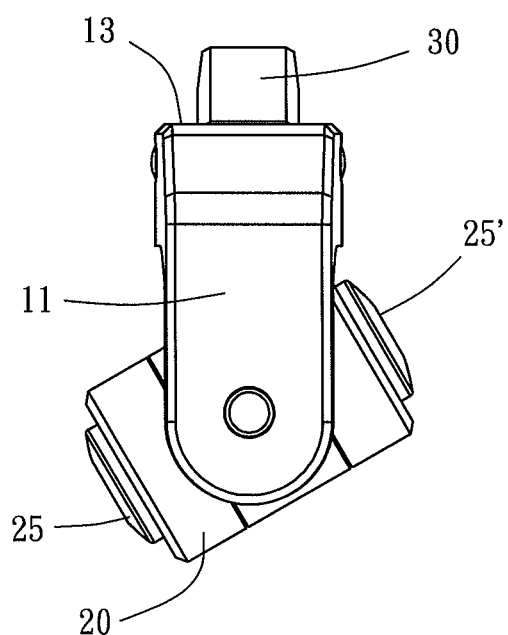
FIG. 4 corresponds to FIG. 3 when viewed from the left side.
Figure 5:
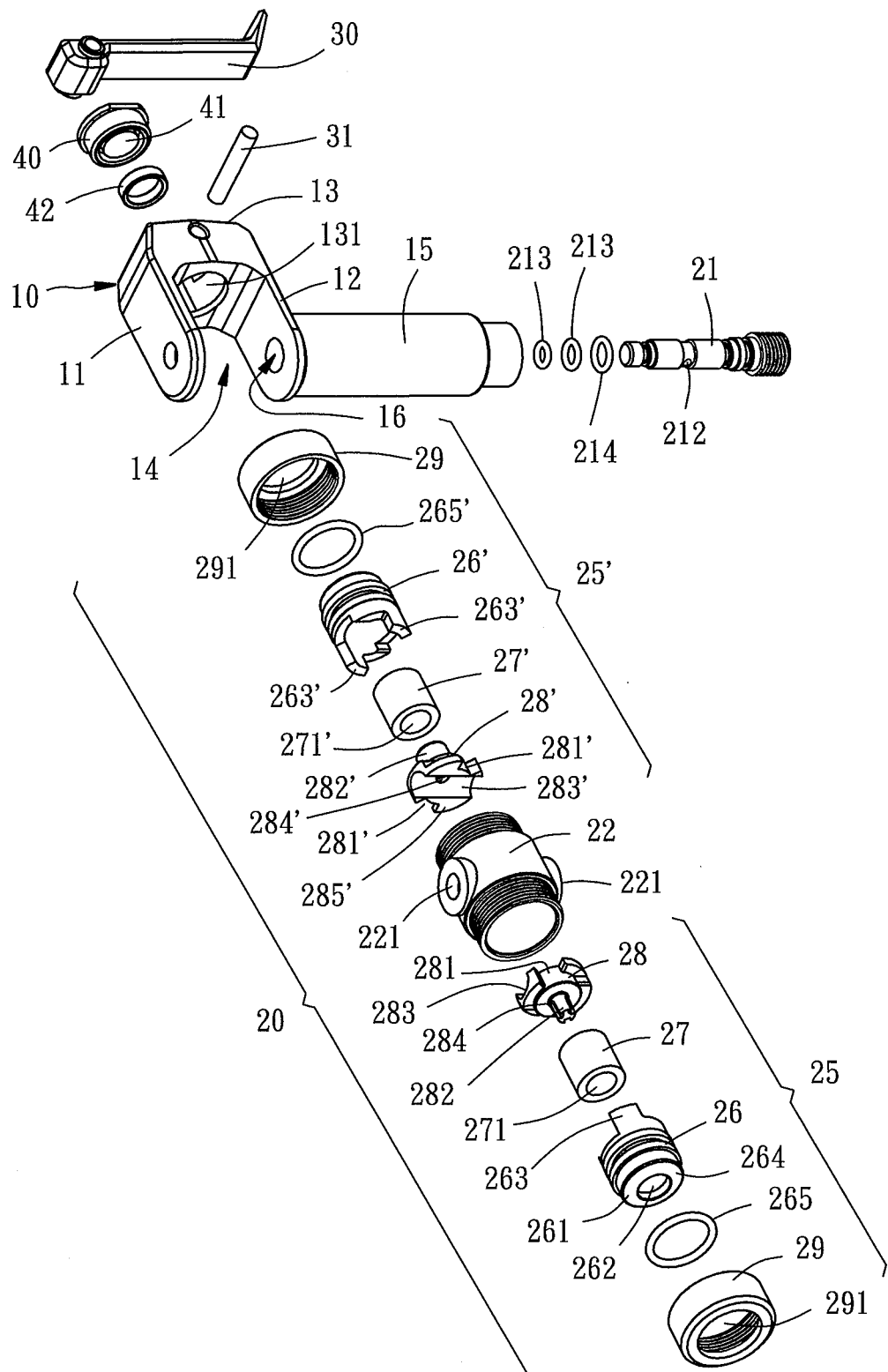
FIG. 5 is an exploded view of the rotary switch type valve cap shown in FIG. 1.
Figure 6:
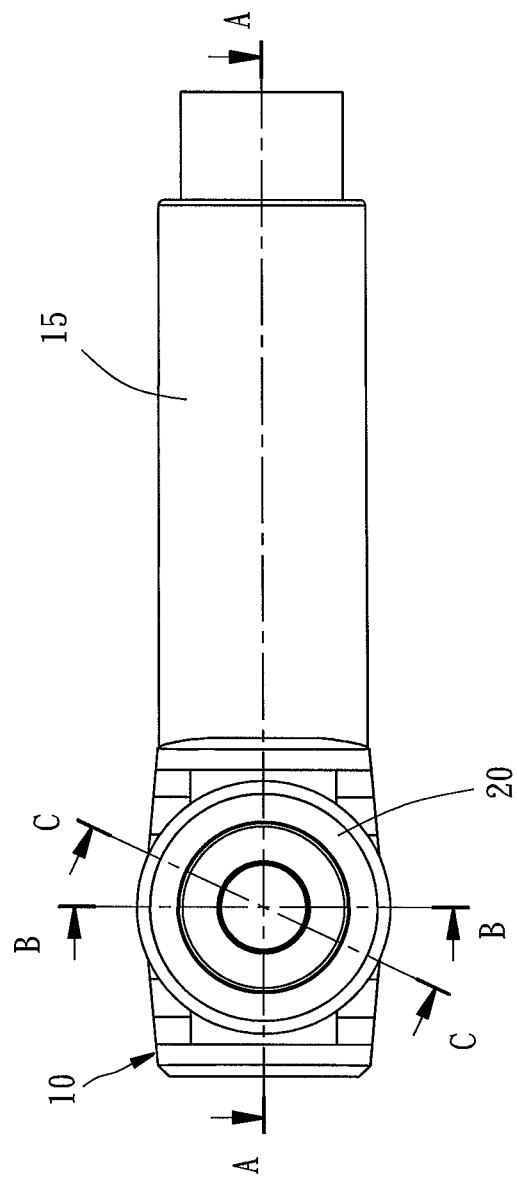
FIG. 6 is a bottom view of FIG. 1.
Figure 7:
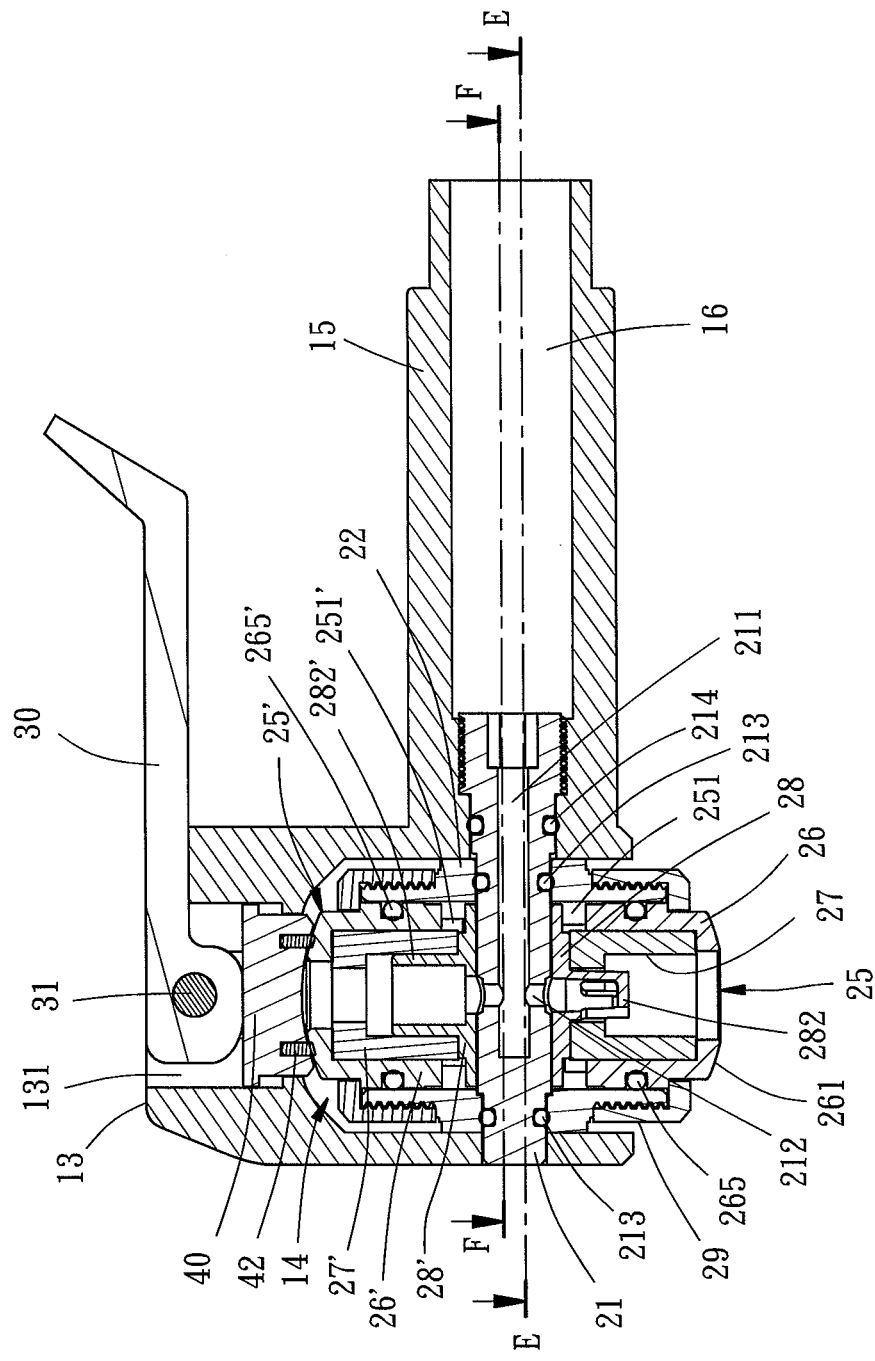
FIG. 7 is a sectional view taken along line A-A of FIG. 6.
Figure 8:
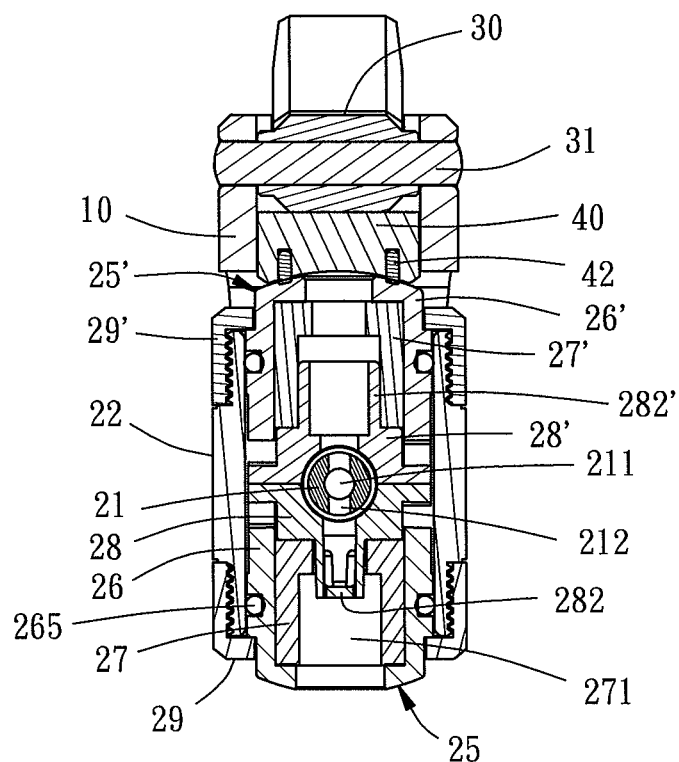
FIG. 8 is a sectional view taken along line B-B of FIG. 6.
Figure 9:
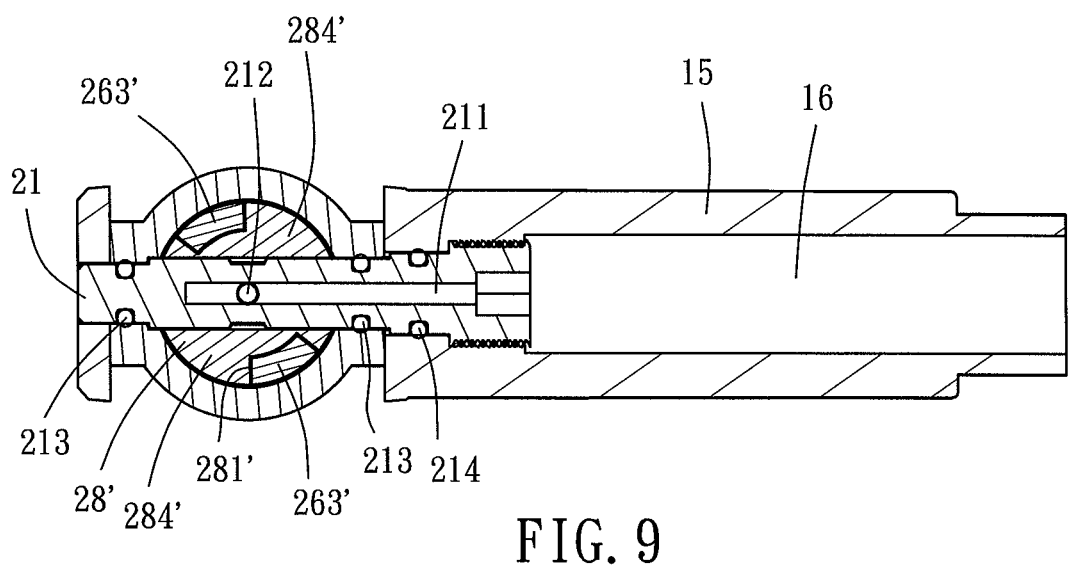
FIG. 9 is a sectional view taken along line F-F of FIG. 7.
Figure 10:
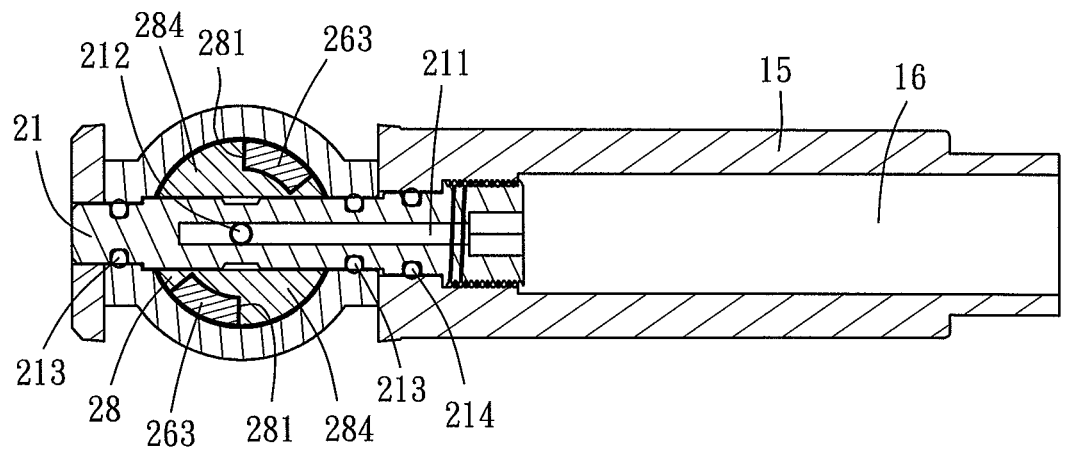
FIG. 10 is a sectional view taken along line E-E of FIG. 7.

When switching between the valve connectors, turn the lever (30) back to the release position, and then rotate the rotating device (20) to exchange the position of the valve connector (25)(25'), as shown in FIGS. 3 and 4.

FIGS. 15-18 illustrate the rotary switch type valve cap used with a Presta (French) valve (2). The action and principle of this application are same as the use with the Schrader (American) valve (1). Therefore, no further detailed description in this regard will be necessary.

Figure 19:
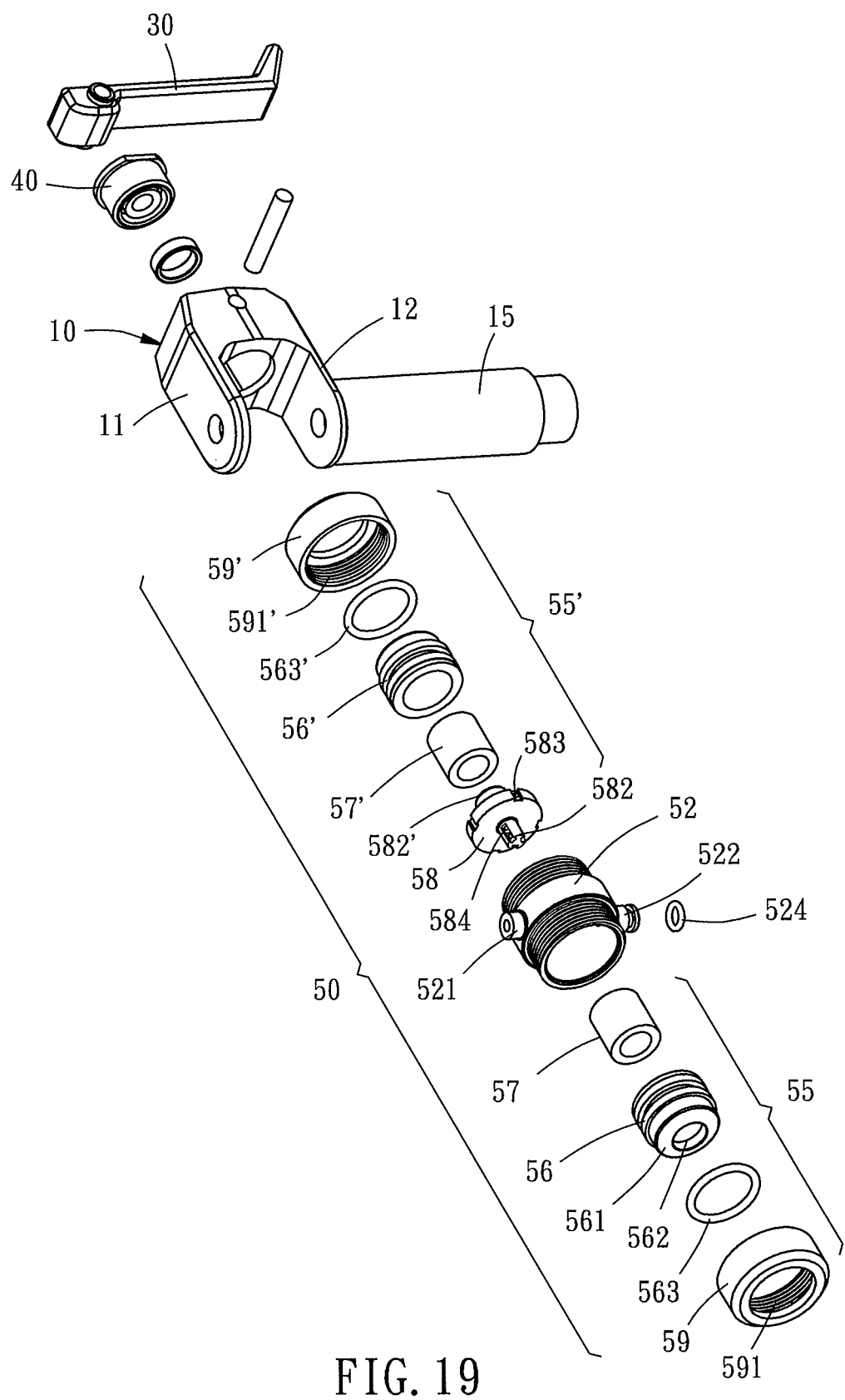
FIG. 19 is an exploded view of a rotary switch type valve cap in accordance with a second embodiment of the present invention.
Figure 20:
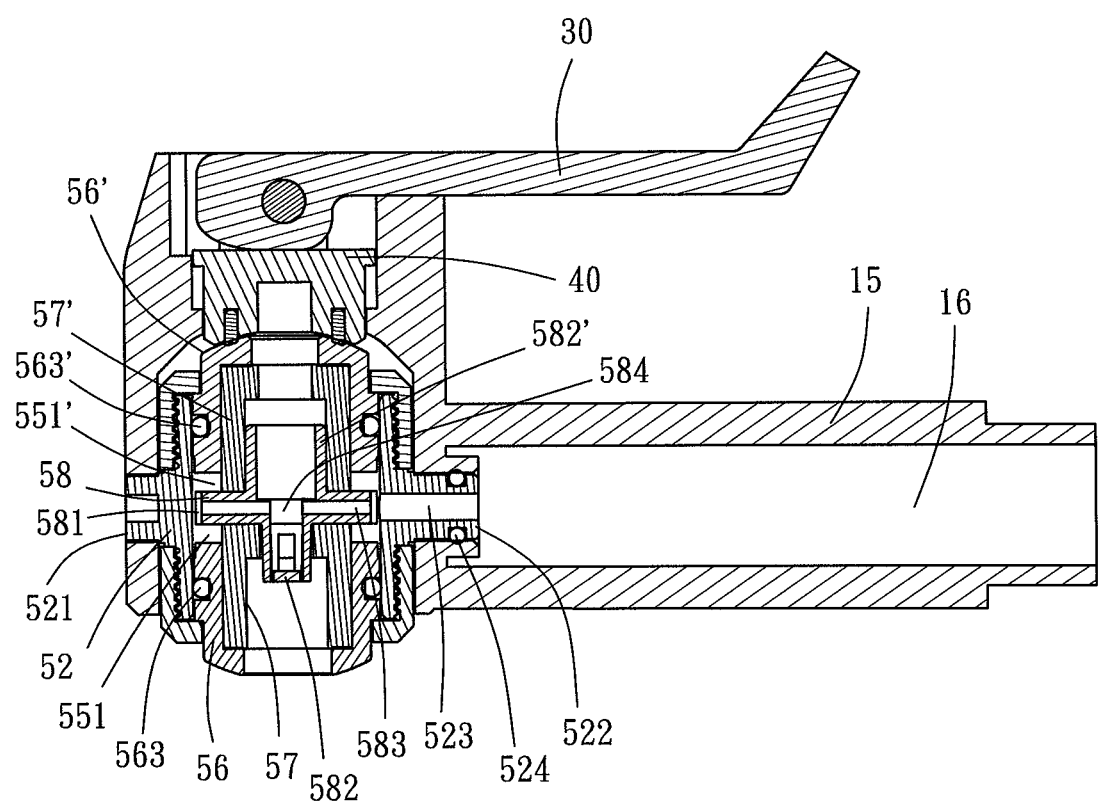
FIG. 20 is a sectional assembly view of the rotary switch type valve cap in accordance with the second embodiment of the present invention.

FIGS. 19 and 20 illustrate a rotary switch type valve cap in accordance with a second embodiment of the present invention. This second embodiment is substantially similar to the aforesaid first embodiment, in which like reference signs denote like components of structure. This second embodiment also comprises a casing (10), a rotating device (50), a lever (30), and a closure member (40). The major difference between this second embodiment and the aforesaid first embodiment is that the rotating device (20) of the aforesaid first embodiment comprises a pivot shaft (21); the rotating device (50) of this second embodiment eliminates the aforesaid pivot shaft, comprising two protruding rods (521)(522) respectively perpendicularly extended from two opposite lateral sides of the body (52) thereof and respectively pivotally connected between the front and rear end walls (11)(12) to substitute for the aforesaid pivot shaft (21); the protruding rod (522) that is pivotally connected to the rear end wall (12) comprises a through hole (523) kept in communication with the air passage (16) of the air intake tube (15) and the inside space of the rotating device (50); further, a seal ring (524) is mounted around the protruding rod (522).

Figure 21:
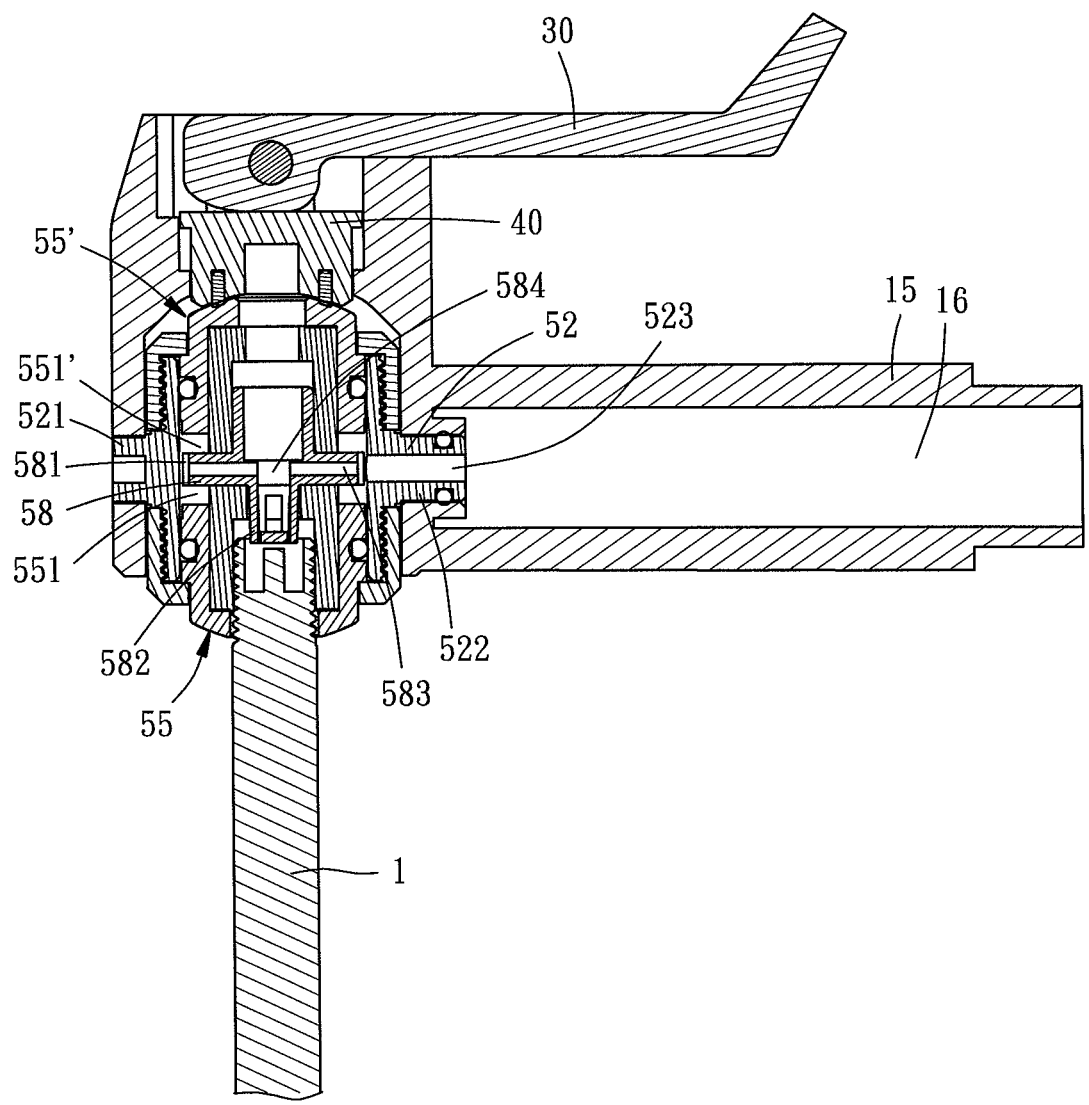
FIGS. 21-24 are schematic operational views of the first embodiment of the present invention wherein the rotary switch type valve cap is connected to connected to a Schrader (American) valve in FIGS. 21 and 22; the rotary switch type valve cap is connected to a Presta (French) valve in FIGS. 23 and 24; the lever shown in FIGS. 21 and 23 is disposed in the release position; the lever shown in FIGS. 22 and 24 is disposed in the pressing position.
Figure 22:
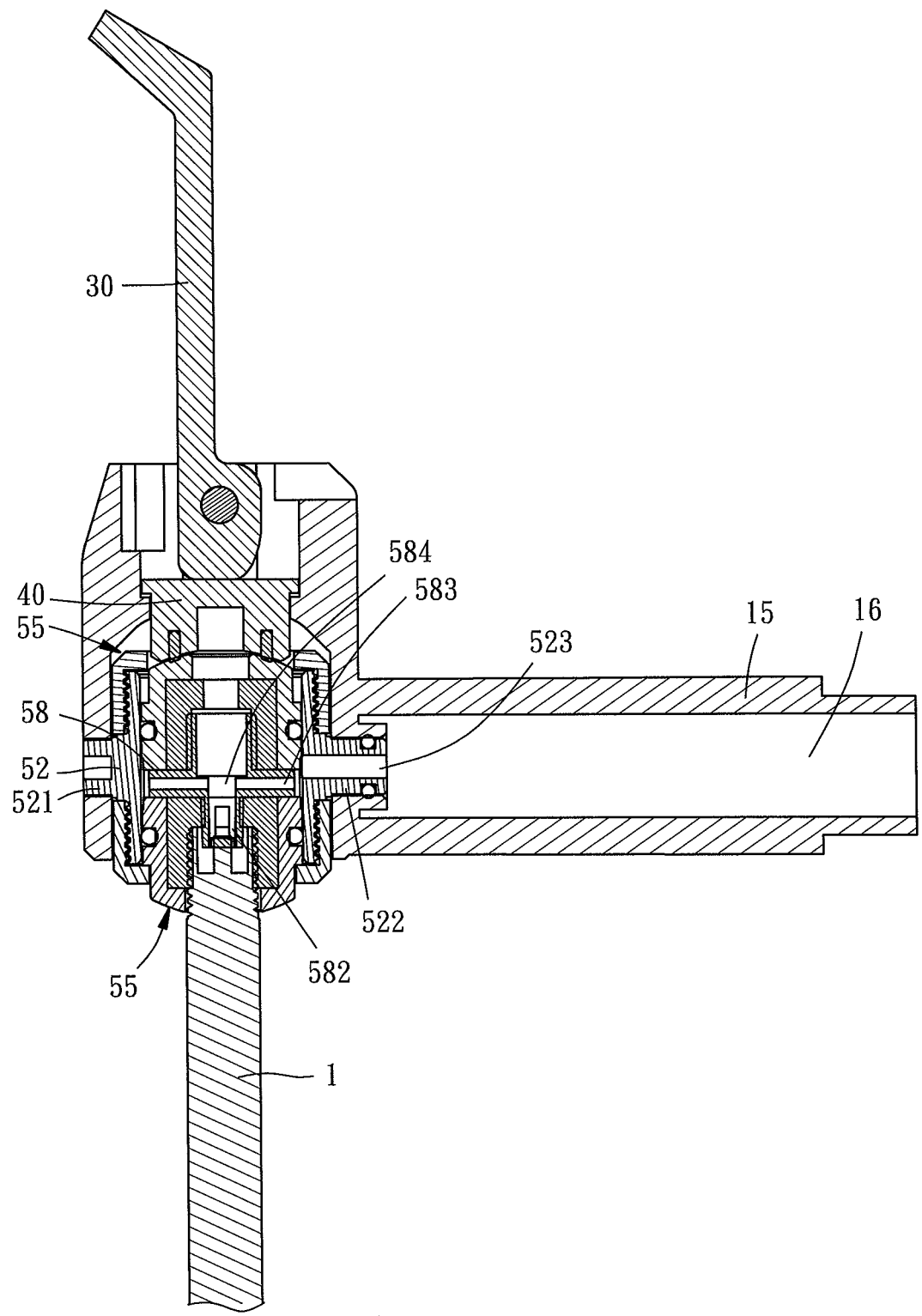
Figure 23:
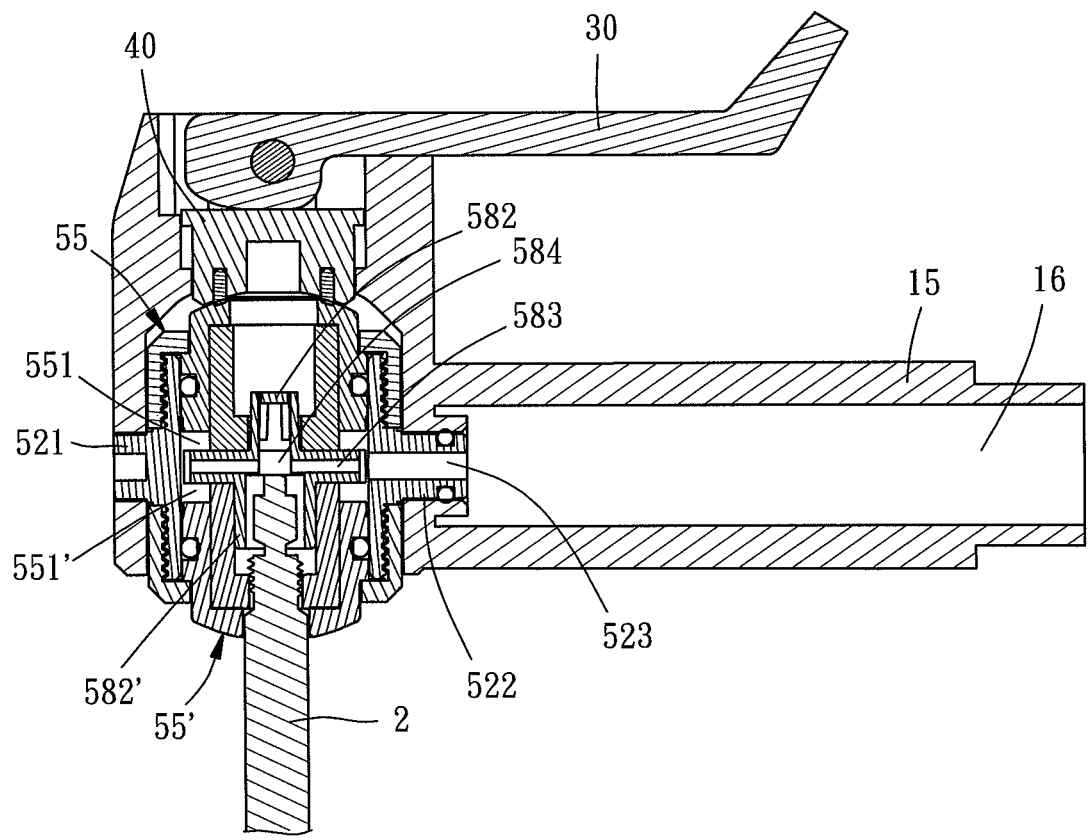
Figure 24:
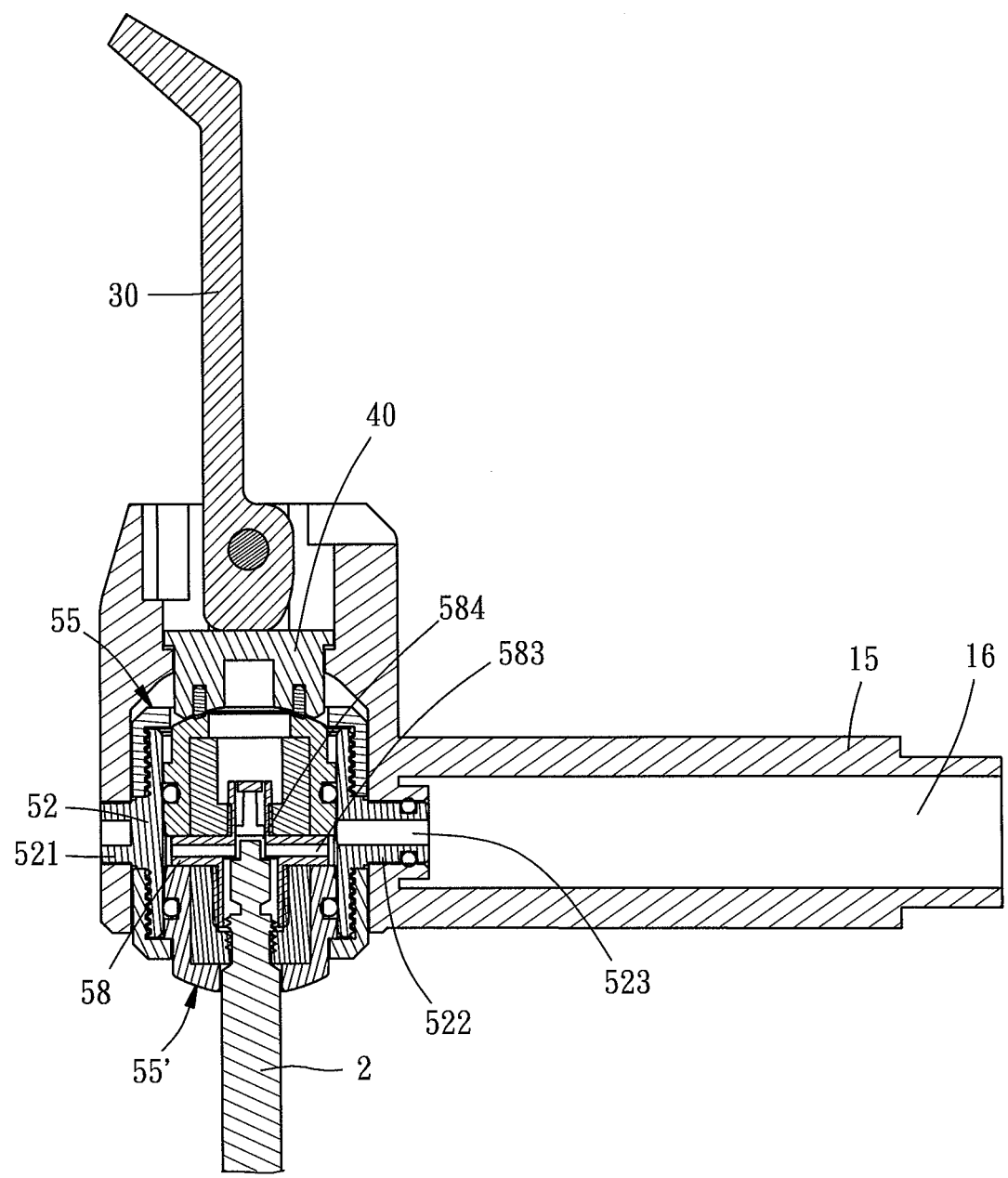

Because this second embodiment eliminates the afore pivot shaft (21) to prohibit hindering the movement of the valve connectors (55)(55') of the rotating device (50), the two valve parts (28)(28') in the aforesaid first embodiment can be made in integrity to form one single valve part (58) for use in this second embodiment; the aforesaid stop rods (263)(263') are eliminated from the housing members (56)(56') of the rotating device (50) in this second embodiment; the length of the two rubber packers (57)(57') is also larger than the depth of the housing members (56)(56'); therefore, when no pressure is applied to the rotating device (50), a gap (551)(551') is still kept between each housing member (56)(56') and the valve part (58); when the lever (30) is biased from the release position to the pressing position (see FIG. 21 and FIG. 22), the lever (30) will force the closure member (40) to move the upper housing member (56') downwards and to further elastically expand the rubber packer (57') in moving the valve part (58) downwardly against the rubber packer (57), causing the rubber packer (57) to elastically expand and to secure the Schrader (American) valve (1) (see FIG. 22) or the Presta (French) valve (2)(see FIG. 24) tightly; at this time, the two gaps (551)(551') are disappeared.

The rotating device (50) comprises a body (52) shaped like a barrel and comprising two protruding rods (521)(522) at two opposite lateral sides thereof wherein one protruding rod (522) comprises a through hole (523) in communication between the inside space of the body (52) and the atmosphere; a seal ring (524) mounted around the protruding rod (522); a valve part (58) accommodated in the body (52) and comprising an annular air passage (581) defined between the inner perimeter of the body (52) and an outer perimeter of the valve part (58), a through hole (583) at the periphery thereof in communication with the air passage (581), two valve protrusions (582)(582') respectively extended from tow opposite sides thereof and configured to fit different valves (1)(2), and a through hole (584) disposed between the two valve protrusions (582)(582') in communication with the through hole (583); two rubber packers (57)(57') respectively disposed at two opposite sides of the valve part (58) around the valve protrusions (582)(582'); two housing members (56)(56') respectively mounted around the rubber packers (57)(57') and defining with the valve part (58) a respective predetermined gap (551)(551') and comprising a through hole (562)(562') at a respective outer end surface (561)(561') thereof; two end caps (59)(59') respectively fixedly mounted at two opposite ends of the body (52) to seal the two housing members (56)(56'), the two rubber packers (57)(57') and the valve part (58) in the body (52), each comprising a through hole (591)(591') for allowing the outer end surfaces (561)(561') of the two housing members (56)(56') to extend out of the respective end caps (59)(59') through the respective through holes (591)(591'); and two seal rings (563)(563') respectively mounted around the housing member (56)(56').

What is claimed is:

1. A rotary switch type valve cap, comprising:
a casing comprising a front end wall, a rear end wall, a top end wall connected between said front end wall and said rear end wall, an accommodation space surrounded by said frontend end wall, said rear end wall and said top end wall, and an air intake tube located at said rear end wall and kept in communication with said accommodation space;
a rotating device pivotally mounted in said accommodation space and freely rotatable, said rotating device comprising a first valve connector and a second valve connector respectively arranged at two opposite ends of the rotating device in such a manner that when said second valve connector is disposed in a hidden position to face toward said top end wall, said first valve connector is disposed in an operating position to face toward a bottom side of said casing where said rotating device is disposed in the normal state;

a lever pivotally mounted at said top end wall and biasable between a release position and a pressing position;

a closure member mounted in said top end wall between said lever and said rotating device in such a manner that when said rotating device is disposed in said normal state, said lever is biasable to said pressing position to hold down said closure member against said second valve connector in said hidden position where said second valve connector is closed and forced to stop said first valve connector in said operating position in positive engagement with the valve to be inflated, wherein said rotating device is pivotally mounted in said accommodation space, wherein said air intake tube is mounted in said rear end wall corresponding to the pivoting position of said rotating device, and wherein said rotating device comprises an axial blind hole defined in a pivot shaft of the rotating device in communication with an air passage in said air intake tube.

2. The rotary switch type valve cap as claimed in claim 1, wherein said rotating device is pivotally connected between said front end wall and said rear end wall of said casing by the pivot shaft that is inserted through said rear end wall in communication with said air intake tube; said pivot shaft comprises said axial blind hole in communication with said air passage of said intake tube, and a radially extended through hole in communication with said valve connectors and said axial blind hole.

3. The rotary switch type valve cap as claimed in claim 2, wherein a body of said rotating device is a tubular member, comprising two through holes disposed at two opposite sides; said pivot shaft is inserted through said air passage of said air intake tube and the two through holes of said body to pivotally connect said body to said casing between said front end wall and said rear end wall, enabling said air passage of said air intake tube to be kept in communication with an inside space of said body via said axial blind hole and said radially extended through hole; said two valve connectors are mounted in said body at opposing top and bottom sides relative to said pivot shaft, wherein each said valve connector comprises: a housing member, a rubber packer, a valve part and an end cap, said housing member being a cylindrical member and comprising a shoulder located at one end thereof, a through hole located at the center of said shoulder for the insertion of a valve to be inflated and at least two stop rods protruded from an opposite end thereof, said rubber packer being accommodated in said housing member and elastically deformable to expand and to reduce an axial hole therein so as to hold down the valve to be inflated, said valve part being mounted in said housing member adjacent to said stop rods, a width of an outer lateral wall of said valve part being approximately equal to a width of said housing member, said valve part comprising a plurality of notches corresponding to said stop rods so that said stop rods are extendable through the respective said notches, said valve part blocking said housing member to hold said rubber packer in said housing member, said valve part comprising a valve protrusion extending toward said rubber packer, said valve protrusion being inserted into the axial hole of said rubber packer, said valve protrusion being configured subject to the configuration of the valve to be secured, said valve part further comprising an elongated arc groove corresponding to said pivot shaft, a through hole located at the center of said elongated arc groove and extending through said valve protrusion and kept in communication with the through hole of said pivot shaft and a plurality of end walls disposed adjacent to said elongated arc groove for pushing the stop rods of the opposite said valve part, said housing member, said rubber packer and said valve part being accommodated in said body, said end cap being fixedly mounted at an outer side of said body to seal said housing member, said rubber packer and said valve part in said body in an airtight manner, said end cap comprising a through hole at the center, said shoulder of said housing member extending through the through hole to the outside of said end cap.

4. The rotary switch type valve cap as claimed in claim 3, wherein said housing member further comprises a convex outer end surface; said closure member comprises a concave inner end surface mating said convex outer end surface, an annular seal ring located at said concave inner end surface to surround the through hole of said shoulder of said housing member; said casing further comprises an accommodation chamber defined in the top end wall thereof; said closure member is accommodated in said accommodation chamber and axially movable back and forth in said accommodation chamber; said lever is pivotally connected to said top end wall by a pivot pin in such a manner that when said lever is biased from said release position to said pressing position, said lever forces said closure member to move toward said housing member and to further seal said housing member; said two housing members each have a respective seal ring mounted thereon to keep the respective said housing member and said body in an airtight manner.

5. The rotary switch type valve cap as claimed in claim 1, wherein said rotating device comprises two protruding rods bilaterally located at a middle part of the rotating device and pivotally connected between said front end wall and said rear end wall, one said protruding rod that is pivotally connected to said rear end wall comprising a through hole kept in communication with the air passage of said air intake tube and the inside space of said rotating device.

6. The rotary switch type valve cap as claimed in claim 5, wherein said rotating device comprises a cylindrically shaped body and comprising two protruding rods at two opposite lateral sides thereof wherein one said protruding rod comprises a through hole in communication between the inside space of said body and the atmosphere; a seal ring mounted around one said protruding rod; a valve part accommodated in said body and comprising an annular air passage defined between an inner perimeter of said body and an outer perimeter of said valve part, a first through hole at the periphery thereof in communication with said air passage, two valve protrusions respectively extended from two opposite sides thereof and configured to fit different valves, and a second through hole disposed between said two valve protrusions in communication with said first through hole; two rubber packers respectively disposed at two opposite sides of said valve part around said valve protrusions; two housing members respectively mounted around said rubber packers and defining with said valve part a respective predetermined gap and comprising a through hole at a respective outer end surface thereof; two end caps respectively fixedly mounted at two opposite ends of said body to seal said two housing members, said two rubber packer and said valve part in said body, each said end cap comprising a through hole for allowing the outer end surfaces of said two housing members to extend out of the respective said end caps through the respective through holes thereof; and two seal rings respectively mounted around said housing member.

7. The rotary switch type valve cap as claimed in claim 6, wherein said housing member further comprises a convex outer end surface; said closure member comprises a concave inner end surface mating said convex outer end surface, an annular seal ring located at said concave inner end surface to surround the through hole of said shoulder of said housing member; said casing further comprises an accommodation chamber defined in the top end wall thereof; said closure member is accommodated in said accommodation chamber and axially movable back and forth in said accommodation chamber; said lever is pivotally connected to said top end wall by a pivot pin in such a manner that when said lever is biased from said release position to said pressing position, said lever forces said closure member to move toward said housing member and to further seal the through hole at the outer end surface of said housing member.

* * * * *